(12) United States Patent
Karles et al.

(10) Patent No.: US 8,227,376 B2
(45) Date of Patent: Jul. 24, 2012

(54) CARBON BEADS WITH MULTIMODAL PORE SIZE DISTRIBUTION

(75) Inventors: Georgios D. Karles, Richmond, VA (US); Gunaranjan Viswanathan, Chandler, AZ (US); John Layman, Blacksburg, VA (US); Shuzhong Zhuang, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 48 days.

(21) Appl. No.: 12/715,216

(22) Filed: Mar. 1, 2010

(65) Prior Publication Data
US 2010/0152040 A1 Jun. 17, 2010

Related U.S. Application Data

(62) Division of application No. 11/636,976, filed on Dec. 12, 2006, now abandoned.

(60) Provisional application No. 60/749,591, filed on Dec. 13, 2005.

(51) Int. Cl.
*B01J 20/00* (2006.01)
*C01B 31/08* (2006.01)
*C01B 31/00* (2006.01)
*B01D 39/00* (2006.01)
*B01F 3/08* (2006.01)
*C08L 91/08* (2006.01)

(52) U.S. Cl. ........ 502/404; 502/416; 502/418; 977/742; 423/445 R; 210/502.1; 516/32; 516/38

(58) Field of Classification Search ............... None
See application file for complete search history.

(56) References Cited

U.S. PATENT DOCUMENTS

| | | | |
|---|---|---|---|
| 3,972,335 A * | 8/1976 | Tiggelbeck et al. | 131/274 |
| 5,116,747 A | 5/1992 | Moo-Young et al. | |
| 5,185,466 A | 2/1993 | Kozulic et al. | |
| 5,286,495 A | 2/1994 | Batich et al. | |
| 5,322,075 A | 6/1994 | Deevi et al. | |
| 5,385,741 A | 1/1995 | Rinn et al. | |

(Continued)

FOREIGN PATENT DOCUMENTS

| | | |
|---|---|---|
| EP | 0326271 | 8/1989 |
| JP | 2005270804 A * | 10/2005 |
| WO | WO 0212380 A2 * | 2/2002 |

OTHER PUBLICATIONS

Fuertes et al.; Preparation of Microporous Carbon-Ceramic Monoliths; Microporous and Mesoporous Materials; 43, 113-126; 2001.*

(Continued)

*Primary Examiner* — Melvin C Mayes
*Assistant Examiner* — Guinever Gregorio
(74) *Attorney, Agent, or Firm* — Buchanan Ingersoll & Rooney PC (57) ABSTRACT

A method of producing a multi-modal pore distribution activated carbon is provided herein by preparing a solution comprising a polymer precursor, mixing an additional material with the polymer precursor in the solution, cross-linking the polymer precursor with the additional material mixed therein, carbonizing the mixture of the polymer precursor and the additional material, and activating the carbonized mixture to form a multi-modal pore distribution activated carbon. The multi-modal pore distribution activated carbon can include pores less than 20 Å and greater than 30 Å or 500 Å depending upon the sorption properties desired, wherein the pore distribution of the activated carbon can be tailored to provide predetermined kinetics and/or gaseous constituent equilibrium isotherms.

19 Claims, 3 Drawing Sheets

U.S. PATENT DOCUMENTS

| | | | |
|---|---|---|---|
| 5,427,935 | A | 6/1995 | Wang et al. |
| 5,499,636 | A | 3/1996 | Baggett, Jr. et al. |
| 5,505,966 | A | 4/1996 | Edman et al. |
| 5,549,908 | A | 8/1996 | Smith et al. |
| 5,550,189 | A | 8/1996 | Qin et al. |
| 5,567,451 | A | 10/1996 | Rinn et al. |
| 5,591,368 | A | 1/1997 | Fleischhauer et al. |
| 5,616,622 | A | 4/1997 | Harris et al. |
| 5,666,976 | A | 9/1997 | Adams et al. |
| 5,692,525 | A | 12/1997 | Counts et al. |
| 5,692,526 | A | 12/1997 | Adams et al. |
| 5,726,118 | A | 3/1998 | Ivey et al. |
| 5,915,387 | A | 6/1999 | Baggett, Jr. et al. |
| 5,934,289 | A | 8/1999 | Watkins et al. |
| 5,988,176 | A | 11/1999 | Baggett, Jr. et al. |
| 6,026,820 | A | 2/2000 | Baggett, Jr. et al. |
| 6,053,176 | A | 4/2000 | Adams et al. |
| 6,090,362 | A | 7/2000 | Gadkaree |
| 6,248,691 | B1* | 6/2001 | Gadkaree et al. ............ 502/423 |
| 6,733,784 | B1 | 5/2004 | Ayres |
| 2003/0232895 | A1 | 12/2003 | Omidian et al. |
| 2004/0194792 | A1* | 10/2004 | Zhuang et al. ............... 131/202 |
| 2006/0231525 | A1* | 10/2006 | Asakawa et al. ............... 216/56 |

OTHER PUBLICATIONS

Roy; Activated Carbon Applications in the Food and Pharmaceutical Industries; TechnoMic Publishing Co. Inc. Lancaster Baser; 1995; Title page.*

Roy; Activated Carbon Applications in the Food and Pharmaceutical Industries; TechnoMic Publishing Co. Inc. Lancaster Baser; 1995; p. 7.*

Ring et al.; Calcium Gelation of Pectic Polysaccharides Isolated from Unripe Tomato Fruit; Carbohydrate Research; 923, 235-249; 1996.*

Williams et al.; New Insights Into the Mechanism of Gelation of Alginate and Pectin: Charge Annihilation and Reversal Mechanism; Biomacromolecules; 6, 963-969; 2005.*

International Search Report and Written Opinion dated Jun. 29, 2007 for PCT/IB2006/004092.

Akkara, et al., "Synthesis and characterization of polymers produced by horseradish peroxidase in dioxane," (1991) *Polymer Science: Part A: Polymer Chemistry*, 29: 1561-1574, John C. Wiley & Sons, Inc.

Diaz-Rojas et al., "Linseed pectin gelling properties and performance as an encapsulation matrix for shark liver oil," *Food Hydrocolloids* 18: 293-304, Elsevier Ltd.

Hennink et al., "Novel crosslinking methods to design hydrogels," (2002) *Advanced Drug Delivery Reviews*, 54:13-36, Elsevier Science B.V.

Ryu et al., "Characterization of Pore Size Distributions on Carbonaceous Adsorbents by DFT," (1999) *Carbon*, 37: 1257-1264, Elsevier Science Ltd.

Sriamornsak et al., "Calcium pectinate gel beads for controlled release drug delivery: I. Preparation and in vitro release studies," (1998) *Int'l J. Pharmaceutics* 160: 207-212, Elsevier Science B.V.

Yang et al., "Preparation and properties of phenolic resin-based activated carbon spheres with controlled pore size distribution," (2002) *Carbon* 40: 911-916, Elsevier Science Ltd.

* cited by examiner

CARBON BEADS WITH MULTIMODAL PORE SIZE DISTRIBUTION

CROSS REFERENCE TO RELATED APPLICATIONS

This application is a divisional application of U.S. application Ser. No. 11/636,976 entitled CARBON BEADS WITH MULTIMODAL PORE SIZE DISTRIBUTION, filed on Dec. 12, 2006, now abandoned, which claims benefit of U.S. Provisional Application No. 60/749,591, filed on Dec. 13, 2005, the entire content of each is hereby incorporated by reference.

BACKGROUND

Conventional cigarettes have filter elements that can incorporate materials such as carbon. Certain commercially available filter cigarettes have particles or granules of carbon (e.g., an activated carbon material or an activated charcoal material) incorporated with the cellulose acetate tow or in cavities of a cellulose acetate material.

Activated carbon has strong physical adsorption forces, and high volumes of adsorbing porosity. Traditionally, activated carbon is formed by activation and carbonization of coconut husk, coal, wood, pitch, cellulose fibers, or polymer fibers, for example. Carbonization can be carried out at high temperatures, i.e., about 200° C. to about 800° C., in an inert atmosphere, followed by activation in an oxidization environment.

As a result of using single composition precursors, single modal pore distributions are attained in activated carbon because of the pore sizes of activated carbon being dependent upon the single composition precursors, and the carbonization and activation processes. Thus, the activated carbon has been provided with a single modal pore distribution, which in turn has only provided predictable, single function adsorption properties.

SUMMARY

Accordingly, a method of forming a multi-modal pore distribution activated carbon is provided herein. The multi-modal pore distribution activated carbon is formed by combining pore size forming properties from multiple materials. For example, multiple carbonizable precursors can be combined in a single carbonizable precursor composite, and then the composite can be carbonized and activated to form multi-modal pore distribution activated carbon. Alternatively, a carbonizable precursor can be combined with a carbon structure, such as a nanotube wherein upon activation and carbonization, a multi-modal pore distribution activated carbon can be formed. Thus, activated carbon can be formed to have a multi-modal pore distribution based upon the pore forming properties of the starting materials.

Additionally, a multi-modal pore distribution activated carbon is also provided herein. The multi-modal pore distribution activated carbon includes a multi-modal distribution of pore sizes with larger and smaller pores. By providing larger pores in a multi-modal pore distribution activated carbon, transporting constituents into the body of an adsorbing carbon particle can be expedited. On the other hand, by providing smaller pores, constituents can be trapped and held by the smaller pores within the body of the adsorbing carbon particle. In an exemplary embodiment, larger pores are provided to aid in the kinetics of adsorption of constituents by speeding up the constituents' diffusion/transport into an adsorbing carbon particle, while smaller pores are provided that are more energetic and thus adsorb and hold the constituents within the activated carbon particle.

Also provided is a multi-modal pore distribution activated carbon comprising activated carbon with a first set of pores with a single mode pore distribution formed by a first carbonizable precursor and a second set of pores formed by a second carbonizable precursor, carbonized structures, zeolites, or combinations thereof, wherein the first carbonizable precursor and the second carbonizable precursor, carbonized structures, zeolites, or combinations thereof, are mixed and heat treated to form the multi-modal pore distribution activated carbon, and wherein the first set of pores has smaller pore size than the second set of pores.

Also provided is a method of producing a multi-modal pore distribution activated carbon comprising the steps of (i) preparing a solution comprising a polymer precursor; (ii) mixing an additional precursor material with the polymer precursor in the solution; (iii) cross-linking the polymer precursor with the additional precursor material mixed therein; (iv) carbonizing the mixture of the polymer precursor and the additional precursor material; and (v) activating the carbonized mixture to form a multi-modal pore distribution activated carbon.

Also provided is a method of making different shape adsorbents by immobilizing and stabilizing precursors in polysaccharide media. By employing this method, precursors usually treated by less desirable process conditions, i.e., slow stabilization below the melting point of the carbon precursor and often requiring the use of solvents, can be immobilized and converted to adsorbent media.

DETAILED DESCRIPTION

Methods are disclosed for forming a multi-modal pore distribution activated carbon (multi-modal pore distribution activated carbon). The multi-modal pore distribution allows for tailoring of the adsorption properties of the activated carbon. This can be accomplished by using a single composite, which includes more than one pore size determinant material.

By using a combination of more than one pore size determinant material, such as carbonizable precursors, carbon structures, zeolites, in a composite; a multi-modal pore distribution activated carbon can be formed with a predetermined pore size distribution.

For example, activated carbon can be formed from a mixture or composite including a first pore forming composition and a second pore forming material. By providing the mixture or composite, activated carbon made from the mixture or composite can have a primarily bimodal pore distribution with the first mode from the first pore forming material and the second mode from the second pore forming material. In other words, activated carbon with two highly uniform bimodal pore sizes (i.e., a highly uniform set of large pores formed from the first composition and a highly uniform set of small pores formed from the second composition) can be formed.

By providing a set of larger pores in a multi-modal pore distribution activated carbon, the kinetics or speed of adsorption by the activated carbon can be increased. The larger pores allow for a larger flux of constituents, as well as larger constituents, as an adsorbate molecule smaller than a pore can pass through the pore entrance and into an inner part of the pore.

The term "constituent kinetic behavior" as used herein is intended to denote flow through surfaces of the activated carbon (i.e., passing gaseous constituents through pores and/or channels in the activated carbon with adsorption or absorption). Thus, depending upon the constituent kinetic behavior of the activated carbon, gaseous constituents can flow through pores of the activated carbon in predetermined amounts as tailored by the pore sizes within the activated carbon. For example, larger gaseous constituents can be trapped in smaller pores and passed through larger pores, thus the constituent kinetic behavior of the activated carbon can be predetermined by the number and sizes of the pores and their pore entrances in the activated carbon. Thus, by providing more numerous and larger sized pores, increased levels of gaseous constituents, both larger and smaller ones, can kinetically flow through the activated carbon.

Larger sized pores, such as macropores, can be used to provide a path for gaseous constituents or molecules to reach interior regions or pores of activated carbon, which as mentioned above, can lead to improved constituent kinetic behavior. Larger pores mainly act to admit adsorbate molecules into an inner part of the activated carbon. The geometry, size, and amount of macropores can significantly affect sorption, especially in filtration processes in which adsorbate molecules move rapidly through a sorbent.

Smaller sized pores, such as micropores, on the other hand can be used to provide sorption of gaseous constituents or molecules once they reach interior regions or pores of the activated carbon by way of constituent kinetic behavior. As used herein, the term "sorption" denotes adsorption and/or absorption by activated carbon. Sorption is intended to encompass interactions on the outer surface of the sorbent, as well as interactions within the pores and channels of the sorbent. Sorption, as opposed to constituent kinetic behavior, is intended to encompass adsorbing or absorbing constituents on surfaces of the activated carbon (i.e., within the pores and channels of the activated carbon). In other words, the smaller sized pores can be used to adsorb and/or absorb gaseous constituents or molecules by condensing or holding molecules of other substances on their surface.

By providing a tailored set of smaller pores in a multi-modal pore distribution activated carbon, the gas and/or gaseous constituent equilibrium isotherm or constituent capacity (e.g., the amount of constituent that can be held within the activated carbon) can be tailored. As the smaller pores allow for the constituents to be trapped by the pores and channels within the activated carbon, constituents passing through the multi-modal pore distribution activated carbon can be adsorbed or absorbed, and the constituents can also be held tighter by the activated carbon.

Another aspect provided herein provides activated carbon that can be formed through a simple manufacturing process without requiring the use of volatile solvents, such as volatile organic compounds (VOC). By using the methods provided herein, improved material utilization and process simplicity can be realized, which in turn can lead to lower costs in producing the final product. For example, carbonizable precursors can be provided through ionic gelation, which allows the carbonizable precursors to be provided inexpensively with little waste and without requiring the use of VOC.

Another aspect provided herein provides for controlling the shape of activated carbon particles. In an exemplary embodiment, spherical activated carbon can be formed through the use of spherical carbonizable precursors. For example, spherical activated carbon can be formed by forming spherical precursors by ionic gelation. When using ionic gelation, a spherical precursor can be formed by forming a liquid drop which gels upon crosslinking via a multivalent cation. The properties of the resulting activated carbon bead can be tailored by selecting predetermined polymers, and/or controlling the ionic gelation parameters, such as the concentration of a multivalent solution (e.g., the concentration of the aqueous calcium chloride solution), the temperature and pressure conditions, the ratio of the polymer with the multivalent solution, the conditions of carbonization, and the conditions of further activation.

The shape can also be controlled by providing for the immobilization of carbonizable precursors applied as a mixture or composite with a gelling polymer. Most carbonizable precursors, such as phenolic resins and pitches, have a melting temperature below their thermal-setting or cross-linking temperatures. Thus, the spherical shape can be lost if precursors are not immobilized by a matrix, such as a polysaccharide matrix.

In exemplary embodiments, activated carbon can be incorporated in one or more locations of a smoking article. By providing the activated carbon in a smoking article, at least some portion of a gas-phase component, such as a gas-phase component of mainstream tobacco smoke, can be removed through sorption into the activated carbon. Activated carbon can be placed in cigarette filters. For example, activated carbon can be placed in the passageway of a tubular free-flow filter, in the free-flow filter, intermingled with fibrous material, and/or in a void space.

A. Activated Carbon Formation

As used herein, "carbonizable precursors" is used as a generic term used to describe any material capable of forming carbon material. In exemplary embodiments, carbonizable precursors are capable of not only forming carbon material, but also forming activated carbon. For example, carbonizable precursors can include non-carbonized material, such as wood, lignite, coal, coconut husk, peat, pitch, polymers, cellulose fibers, polymer fibers, and/or mixtures thereof; previously partially or fully carbonized material, such as carbon particles, carbon nanotubes, and/or mixtures thereof; and/or mixtures of non-carbonized material with previously partially or fully carbonized material.

As used herein, "activated carbon" is used as a generic term used to describe a family of carbonaceous adsorbents with an extensively developed internal pore structure. Activated carbon can be produced by stabilizing carbon, if necessary, then activating the carbon, such as amorphous (non-graphitic) carbon, wherein amorphous (non-graphitic) carbon can be produced by carbonizing one or more carbonizable precursors, as mentioned above. While activated carbon generally is formed from amorphous (non-graphitic) carbon, activated carbon may also be formed from non-amorphous carbon, such as carbon nanotubes.

As used herein, "carbonization" is meant to indicate a process of taking a precursor material and heating it to an elevated temperature and for an effective amount of time to sufficiently carbonize the mixture to produce a carbonized body. For example, the composition can be heated at a temperature of from about 300° C. to about 1000° C. and preferably from about 600° C. to about 800° C. for a period of from about ½ hour to about 20 hours in an inert or reducing atmosphere to carbonize the phenol resins in the mixture. For example, carbonization of a polysaccharide can occur at a temperature above about 600° C. in an inert atmosphere. The gas atmosphere can contain, for example, inert gases, such as nitrogen and/or argon. Preferably, the carbonizing atmosphere does not contain oxygen, because oxygen will react with carbon and remove material from the carbonized body.

As used herein, "activation" is used to indicate a process of taking a carbonized precursor material and heat treating the carbonized precursor material with an oxidizing agent, e.g., carbon dioxide or steam, to develop a desired pore structure in the activated carbonized body. Activation can be conducted, for example, in an oxygen-containing atmosphere, such as in steam, carbon dioxide, oxygen, or mixtures thereof. Oxygen in the atmosphere reacts with carbon, thereby removing carbon from the carbonized body and producing pores. In a preferred embodiment, activation is conducted at a temperature of from about 800° C. to about 1000° C., and for a period of from about 10 minutes to about 5 hours. During activation, some of the carbon can be reacted with the oxidizing agent to form pores of various sizes in the activated carbon.

In an exemplary embodiment, a carbonized body can be activated to achieve a desired "burn-off" or "percent burn-off," which represents the weight loss of the carbonized body that occurs during activation (i.e., percent burn-off=(100)×(initial weight before activation-final weight after activation) ÷initial weight before activation). As the percent burn-off is increased, the pore surface area increases. In an exemplary embodiment, the surface area of activated carbon can be measured through the BET (Brunauer, Emmett and Teller) method, wherein the surface area of the activated carbon after activation can be from about 500 $m^2/g$ to about 1500 $m^2/g$. Additionally, by controlling processing steps, the burn-off can also be controlled. Thus, pore sizes can be modified based upon the processing steps and the burn-off.

In addition to controlling the pore sizes and pore development of the activated carbon through activation, activation can also be tailored to control the compressive strength of the activated carbon. For example, increasing the burn-off of carbon can reduce the compressive strength of the activated carbon, while increasing the porosity and pore size and thus ultimately changing constituent kinetics and filtration performance characteristics. Accordingly, the burn-off can be controlled to produce an activated carbon that has a desirable combination of carbon surface area, compressive strength, and pore sizes, to thereby provide activated carbon with predetermined characteristics, such as constituent kinetic behavior, gas and/or gaseous constituent equilibrium isotherm or constituent capacity and/or mechanical strength.

Burn-off can be controlled to control the pore size, pore volume, and density of the activated carbon, and thus the capacity of the activated carbon to adsorb selected gas-phase constituent. For example, one or more of the activation atmosphere, activation gas flow rate, activation temperature, and activation time can be varied to control the pore structure of the activated carbon.

Activated carbon can be in the form of granules, spheres, monoliths, beads, powders and/or fibers. In exemplary embodiments, activated carbon can be provided with an average particle size of about 6 mesh size to 300 mesh size, wherein the particle size and the particle size distribution can be tailored based upon the composition of the precursor material and the processes by which the activated carbon is produced.

Precursor materials can be selected for their pore forming attributes upon carbonization and activation. In exemplary embodiments, the precursor material or materials selected leave substantially no residue upon thermal decomposition during carbonization.

The precursor material or materials can have any suitable form, such as, for example, particles, granules, nanotubes, fibers, and/or combinations thereof. The pore-forming substance can be in the form of long fibers, which decompose to form straight channels in the activated carbon. Alternatively, the pore-forming substance can be carbon nanotubes which maintain their structure throughout the carbonization and activation processes to provide channels throughout the activated carbon. Such channels can have a desired size, shape and number that can provide gas permeability or impermeability based upon the pores formed in the activated carbon by the pore-forming substance.

As used herein, the term "remove" refers to adsorption and/or absorption of at least some portion of a gas-phase or liquid phase constituent.

The terms "heated" or "heating" are meant to include elevating the temperature of a precursor to the point at which carbonization and/or activation would generally occur, such that the precursor is carbonized or activated by heat treatment.

The terms "stabilization," "curing," "cross-linking" and "thermal setting" are utilized interchangeably herein to describe stabilizing the shape of a precursor material prior to carbonizing the precursor material.

B. Activated Carbon Pore Sizes

Highly activated carbon can have a range of sizes, but as mentioned above, can have tailored pore sizes due to the intrinsic porous structure resulting from a tailored selection of more than one composition used in an activated carbon precursor material.

Activated carbon can include a distribution of micropores, mesopores and macropores. The term "microporous" generally refers to such materials having pore sizes of about 20 Å or less, while the term "mesoporous" generally refers to such materials with pore sizes of about 20 to about 500 Å. The term "macroporous" refers to pore sized above 500 Å. The relative amounts of micropores, mesopores and macropores can be pre-selected relative to the selected constituents from mainstream tobacco smoke that are to be targeted and removed. Thus, the pore size distributions can be adjusted for certain applications by tailoring the carbonizable precursor compositions in the precursor material to allow a multi-modal pore distribution in the activated carbon as desired.

For further discussion on pore sizes, see Ryu et al, "Characterization of Pore Size Distributions on Carbonaceous Adsorbents by DFT," 1999 *Carbon,* 37: 1257-1264, which is hereby incorporated in its entirety for all purposes, and portions of this discussion are found below.

The volume of a macropore may be up to 0.8 $cm^3/g$, whereas the specific surface area of macropores can be so small that it can be negligible, so macropores do not have any appreciable effect on adsorption value. Macropores can, however, be used as transport arteries, making the internal parts of carbon readily accessible to the molecules adsorbed.

The sizes of mesopores can be much larger than the molecules adsorbed. Due to the overlaps of opposite wall adsorption force, adsorption potentials in micropores can be high. Since there is an adsorption-force field in the entire volume of micropores, adsorption of vapor in micropores leads to their volume filling. However, these limits are to some extent arbitrary since the pore filling mechanisms are dependent on the pore shape and are influenced by the properties of adsorbate and by the adsorbent-adsorbate interactions.

Micropores are useful in adsorption, as micropores can be considered as the voids that can accommodate molecules therein.

In the view of the different features of pores based upon their sizes, as well as in order to synthesize and apply carbonaceous adsorbents, their surface and structural properties can be characterized. Pores of adsorbents can be formed by gasification in steam and/or $CO_2$ or by chemical activation with KOH etc. at 500° C.~1000° C. Physisorption measurements can be used to investigate the texture of porous carbons. The phenomenon of physisorption is a general one—unlike chemisorption—and occurs whenever a gas is brought into contact with an outgassed solid. Adsorption measurements provide a useful "fingerprint" of the microstructure and are essential if the carbon is used as an adsorbent or catalyst support. The pore size distribution (PSD) can also be obtained from a gas adsorption measurement.

In addition to the pore sizes being dependent upon the precursor material, the quality and the mechanical strength of the activated carbon also depends upon the precursor material that is used. For example, activated carbon formed from lower density precursors, such as coconut husks, can have larger pores, as well as a lower overall structural density and a lower mechanical strength than activated carbon formed from higher density precursors, such as pitch. However, carbonizing and activating a higher density precursor, such as pitch, can form activated carbon with smaller pores; thus, carbon adsorbents based on pitch are usually more expensive and can involve special process conditions in order to form spherical shaped articles.

The methods described herein have several advantages. For example, the methods provide for the formation of spherical activated carbon which can have controlled sizes and tailored internal porosities, wherein the tailored porosities can be controlled through selection of more than one carbonizable precursor for use in a single precursor composite.

The use of more than one carbonizable precursor can lead to the formation of multi-modal pore size distributions. Thus, for example, one of the precursor compositions can include natural polymers, such as polysaccharides. By using natural polymers, large pores in activated carbon particles can be formed due to a macroporous network formed by the natural polymers. Additionally, a second precursor composition can be combined with the first precursor composition to form a composite, wherein the second precursor composition can include synthetic polymers, such as phenolic resins, petroleum pitches or other synthetic resins. By using synthetic polymers, small pores, such as micropores, can be formed due to higher carbonization efficiency of the synthetic polymers.

Activated carbon can be capable of selectively removing selected gaseous and liquid constituents from a gas flow or a liquid mixture, respectively. In an exemplary embodiment, the activated carbon is formed from more than one carbonizable precursor, thus forming a sort of "composite" of the more than one carbonizable precursor. Thus, the activated carbon can include one or more activated, carbonized materials, herein the activated carbon therefore has one or more pore structure distributions. Preferably, through the use of the more than one pore structure, the activated carbon can be especially suited for targeted removal of selected gaseous constituents from gases, and also especially suited for predetermined constituent kinetic behavior within the activated carbon.

As used herein, "pore size distribution" is used to indicate a pore size distribution of a majority of the pores in single carbonizable precursor upon carbonization and activation, or a distribution of more than one carbonizable precursor with more than one modal pore distribution based upon the more than one carbonizable precursor. For example, pectin can be carbonized and activated to form activated carbon with a single pore size distribution, wherein the pore size distribution includes a narrow range of pore sizes, which are primarily large sized macropores with very few micropores within the distribution, thus forming a unimodal pore size distribution.

As used herein, "multimodal pore size distribution" is used to indicate pore size distribution that includes increases at modal distribution areas. In other words, a multimodal pore size distribution inherently includes pores in a range of sizes, wherein peaks displaying multimodal characteristics merely represent a higher incidence of pore sizes corresponding to the size of pore for the peak.

For example, a bimodal or multi-modal pore size distribution can be formed by carbonizing and activating a composite precursor including pectin and phenolic resin, wherein the pore size distribution of the activated, carbonized pectin includes a narrow range of primarily large sized macropores (i.e., forming primarily macropore sized pores with very few micropores or mesopores). The pore size distribution of the activated, carbonized phenolic resin can include primarily small sized micropores (i.e., forming primarily micropore sized pores with very few macropores or mesopores). Additionally, mesopores can be formed by activating and carbonizing polymers such as pitch.

Thus, a bimodal pore size distribution activated carbon can be formed from the composite precursor with two major pore size distribution groups: one group of pores with a primarily large sized macropores from the pectin; and a second group of pores with primarily small sized micropores from the phenolic resin without very many intermediate sized pores within the activated carbon. For example, in exemplary embodiments, a first precursor material of pectin can lead to pore sizes of about 500 Å or more while a second precursor material of phenolic resin can lead to pore sizes of about 20 Å or less. Thus, activated carbon with primarily pore sizes below 20 Å and above 500 Å can be attained from activating and carbonizing a two component, composite precursor material.

C. Precursor Materials

As used herein, "polymer" is used to indicate any polymer, such as natural or synthetic polymer. In exemplary embodiments, activated carbon is formed from precursors, which include one or more polymers therein. Preferably, the precursor includes a polymer material that can be carbonized and activated to form activated carbon with pore size distribution characteristics that are known and reproducible. Reproducible pore size distribution allows for adsorption selectivity of the activated carbon to be predetermined.

Exemplary polymers which have activation and carbonization predetermined pore size distribution characteristics include, but are not limited to: natural polymers, such as pectin, alginate or starch, cellulose and modified cellulosics, gelatin, chitosan, carageenan, gums, synthetic polymers, such as phenolic resins, petroleum pitches, coal tar pitches, tar, wood, polyacrylonitrile or other synthetic resins, polypropylene, polyethylene, polyaromatic resins (divinylbenzene/styrene, poly(ethylene oxide), poly(ethylene glycol), poly(acrylic acid), polyHEMA (2-hydroxy-ethyl methacrylate), polymethacrylates, polyethylene therephthalate (PET), polypyrrole, polypyridine, porphyrin, poly(vinyl acetate), poly(vinyl alcohol), various block poly(ethylene oxide)-poly(propylene oxide) copolymers, other copolymers or other block copolymers or their derivatives and/or combinations thereof. The polymers can also be hydrogels, which can be crosslinked for stability, then activated and carbonized to form activated carbon with specific shape and pore size characteristics.

The term "natural polymer" is meant to include, but is not limited to, polymers that are produced from natural sources of plant or animal origin. Exemplary natural polymers include polymers that can be cross-linked to promote phase separation, densification and specific shape formation. After cross-linking, the polymers become infusible such that the geometric shapes (e.g., spherical shapes) can be retained at elevated temperatures. After cross-linking, the polymers can also form macroporous networks upon carbonization and activation, thus allowing for large pores to be formed in activated carbon particles. For example, polysaccharides, such as pectin, alginate, etc. can be used because they can be made water-insoluble and become infusible through cross-linking. The reagents also have the characteristics of being able to form large pores upon carbonization and activation.

Pectin can be made from different plant sources (e.g., linseed, fruit, or citrus derived pectin) and can have variable degrees of esterification and amidation, as well as varying degrees of methoxy groups. For discussion on such pectin classifications, see, e.g., Sriamornsak et al., "Calcium pectinate gel beads for controlled release drug delivery: I. Preparation and in vitro release studies," 1998 *Int'l J. Pharmaceutics* 160: 207-212, and Díaz-Rojas et al., "Linseed pectin gelling properties and performance as an encapsulation matrix for shark liver oil," 2004 *Food Hydrocolloids* 18: 293-304.

The term "synthetic polymer" is meant to include, but is not limited to, phenolic resins and pitch. The term "phenolic resins" is intended to include, but is not limited to, any phenolic polymers, including commercially available phenolic resins and phenolic polymers synthesized by techniques known to those of skill in the art, phenolic copolymers, blends of phenolic polymers with other polymers, and blends containing additives, and mixtures thereof. As a result of activating and carbonizing phenolic resins, micropores can be formed. The term "pitch" is intended to include, but is not limited to, coal tar and petroleum pitch. As a result of activating and carbonizing pitch, mesopores can be formed.

In a phenolic polymer, the phenyl ring can be substituted with one or more hydroxy groups, preferably one or two. The phenyl rings of the phenolic polymers can also be substituted with one or more functional groups such as halo-; nitro-; alkyl; alkenyl; alkynyl; haloalkyl; hydroxyalkyl; cyanoalkyl; alkylthio; alkoxy; alkoxyalkyl; alkenoxy; alkenoxyalkyl; haloalkoxy; haloalkylthio; amino; carboxylic; acyloxy; cycloalkyl; aryl; substituted aryl; heteroaryl; substituted heteroaryl; aryloxy; arylalkoxy; arylalkoxyalkyl; alkylcarboxylalkyl; alkyloxycarboxy; sulfonic acid; and combinations thereof.

The hydroxy group or the other functional groups of the phenyl ring of the phenolic polymer can be reacted to provide additional types of functionalization in the phenolic polymers. For example, a hydroxy group of the phenolic polymer can be reacted with aminopropylsilane to graft an amino functional group onto the phenolic polymer.

Commercially available phenolic polymers are available as phenolic resins. Phenolic resins can be the condensation product of phenol and formaldehyde and can be differentiated into primarily two types, novolak and resole, depending on the reactant ratio and the catalyst used. Novolaks are made with an acid catalyst and with a phenol/formaldehyde ratio of larger than one, so they have a linear structure and are cured with a cross-linking agent. Resoles are made with an alkaline catalyst and with a phenol/formaldehyde ratio of less than one, so they can have a multi-functional structure that can be self-cured with no need for a curing agent. The phenolic polymers can be commercially available novolaks, commercially available resoles, and mixtures thereof. Novolak phenolic resins are commercially available in a variety of molecular weights, all of which can be herein suitable, and are commercially available from Durez Corporation (Addison, Tex.). Resole phenolic resins are also commercially available in a variety of molecular weights, all of which can be herein suitable, and are also commercially available from Durez (Addison Tex.).

Phenolic resins are also available as Bakelite AG™ from Georgia Pacific (Atlanta, Ga.). Additionally, phenolic resins are commercially available from a variety of manufacturers, including, for example, Amoco Electronic Materials (Alpharetta Ga.), Cytec Fiberite, Inc. (Tempe, Ariz.), Occidental Chemical Corp (Dallas, Tex.), Plaslok Corp. (Buffalo, N.Y.), Plastics Engineering, Inc. (Auburn Hills, Mich.), Resinoid Engineering Corp. (Hebron, Ohio), Rogers Corp. (Rogers, Conn.), Ametek/Westchester Plastics (Nesquehoning, Pa.), Schenectady International, Inc. (Schenectady, N.Y.), Solutia, Inc. (St. Louis, Mo.), and Union Carbide Corp. (Danbury, Conn.).

In addition to commercially available phenolic polymers, the phenolic polymers can be synthesized by any technique to synthesize phenolic polymers. These techniques include, for example, condensing any reactive phenol or substituted phenol with a reactive aldehyde. In addition, techniques to synthesize phenolic polymers include polymerization of phenols or substituted phenols using enzymes, as described in Akkara, et al., "Synthesis and Characterization of Polymers Produced by Horseradish Peroxidase in Dioxane," 1991 *Polymer Science: Part A: Polymer Chemistry*, 29: 1561-1574.

Phenols, which can be used to synthesize the phenolic polymers, include, for example, phenol ($C_6H_5OH$); cresoles (including meta-, ortho-, para-, and mixtures thereof) ($CH_3C_6H_4OH$); xylenols (($CH_3$)$_2C_6H_3OH$); p-phenylphenol ($C_6H_5C_6H_4OH$); bisphenols (($C_6H_4OH$)$_2$); resorcinol ($C_6H_4(OH)_2$); p-tertiarybutylphenol; alkyl substituted phenol; diphenylolpropane; and the like, and mixtures thereof. Reactive aldehydes, which can be used to synthesize the phenolic polymers, include, for example, formaldehyde and furfural.

The phenolic polymers can also be copolymers of a phenolic polymer and a copolymerizable monomer. Copolymerizable monomers include but are not limited to cresols (including meta-, ortho-, para-, and mixture thereof), xylenols, p-phenylphenol, bisphenols, resorcinol, p-tertiarybutylphenol, alkyl substituted phenol, diphenylolpropane, phenols with additional polymerizable functionality (such as p-vinyl phenol) or methacrylates (such as 2-(4-hydroxyphenyl)ethyl methacrylate), and the like, and mixtures thereof. The copolymerizable monomers can also include polyesters, unsaturated polyesters, epoxies, melamine-formaldehyde, polyimides, urea-formaldehydes, and the like, and mixtures thereof. The copolymerizable monomers can further include styrene, diallyl phthalate, diacetone acrylamide, vinyl toluene, mixtures thereof and the like.

The phenolic polymers can also be a blend of a phenolic polymer with any other polymer system that is miscible with the phenolic polymeric solution or melt. Phenolic polymers can be miscible with any polymer system that is a hydrogen bond acceptor. The polymers that can be blended with the phenolic polymers include but are not limited to poly(acrylic acid), poly(vinyl acetate), cellulose acetate, poly(ethyleneimine), poly(ethylene-co-vinylacetate), poly(lactic acid), mixtures thereof, and the like.

The amounts and types of the precursor materials added to a precursor composite can be selected to provide a desired pore volume, as well as pore size distribution resulting from decomposition of the precursor materials during carbonization. For additional discussion of carbonization and activation of a carbon containing composition, see for example, commonly assigned United States Patent Application Publication No. 2004/0194792, which is incorporated by reference herein in its entirety for all purposes.

Additionally, pre-carbonized structures can also be used in the carbonizable precursor material to form a composite of carbonized structures and carbonizable precursor material. For example, pore-forming or channel-forming carbonized structures, such as carbon nanotubes, can be incorporated into a carbonizable precursor material, such as pectin, to form a composite. By carbonizing and activating the composite, the pore-forming or channel-forming structures can be unaffected, while the carbonizable precursor material can be carbonized and activated. Thus, the structure of the carbonized structures would be maintained within an activated carbon with the characteristics of the activated carbon from the carbonizable precursor material.

Also, zeolites or pre-activated carbon powder can be used in lieu of the carbonized structures mentioned above. For example, zeolites can be mixed with pectin to form a composite. This composite can then be carbonized and activated to form a bimodal activated carbon with a first set of pores with a predetermined pore size from the zeolite and a second set of pores with a predetermined pore size from the carbonized and activated pectin.

Additionally, pore forming agents, such as polymers or metals, can be added to a precursor material to alter pore sizes. For example, polyethylene glycol and polyvinyl butyral can be added to phenolic resin to form mesopores from the otherwise micropores formed by the phenolic resin in a resulting activated carbon. As another example, ferrocene can be added to phenolic resin to form both mesopores and micropores in an otherwise microporous activated carbon. See for example Yang et al, "Preparation and Properties of Phenolic Resin-Based Activated Carbon Spheres with Controlled Pore Size Distribution," 2002 *Carbon* 40: 911-916.

D. Methods of Forming Multi-Modal Pore Size Distribution Activated Carbon

Methods are provided for cross-linking a carbonizable precursor composite with a carbonizable, cross-linked polymer precursor material and an additional carbonizable precursor material, carbonized structures, zeolites, or combinations therein. By using more than one material in the carbonizable precursor composite, activated carbon can be formed from the composite with a multi-modal distribution comprising pores, as mentioned above. Therefore, a multi-modal distribution of pore sizes can be tailored to have predetermined pore size distributions based upon the combining of a plurality of precursor materials into a single carbonizable precursor composite.

Additionally, by using a cross-linked polymer within a precursor composite, heat-tolerant structural definition can be provided to the precursor composite. For example, cross-linking of a polymer material in the precursor composite can be used to provide structural definition to the precursor composite, wherein additional precursor material can then be structurally supported by the cross-linked polymer during the stabilization stage. As the polymer can be cross-linked, any material can be used for the additional precursor material without requiring structural stability before, during or after carbonization and/or activation, as the structural stability can be provided by the cross-linked polymer alone. It is noted that the stabilization stage can be shortened or bypassed, which can result in a higher throughput process.

For example, pectin can be provided and cross-linked to provide structural definition during stabilization carbonization and activation to particles formed from a combination of pectin and phenolic resin. It is noted that the use of the cross-linked pectin provides structure to the precursor composite, as the phenolic resin can otherwise melt during curing, and therefore can lose its structural definition if not for the structural definition provided by the pectin.

Cross-linking of the carbonizable polymer can be achieved by various means depending on the nature of the carbonizable polymer. For example, cross-linking of the carbonizable polymer can occur via chemical reaction or physical attachment. Examples of chemical reaction cross-linking include chemical reaction using complementary groups and/or enzymes. Examples of physical attachment include high energy irradiation, ionic gelation, crystallization, forming hydrogen bonds from amphiphilic block and graft copolymers, and the like. Preferably, physical cross-linking is employed for carbonizable polymers, such as polysaccharides, wherein the physical cross-linking occurs by ionic gelation.

Polysaccharides can be used, because they can be made water-insoluble and relatively heat stable at lower temperatures (e.g., below about 75° C.) through cross-linking. Further, cross-linked polysaccharides can be cross-linked by ionic gelation, which includes forming salt bridges between polysaccharide chains, wherein the salt bridges allow the polysaccharides to maintain stability and shape of the carbonizable precursor material.

Ionic gelation can be provided through multivalent cations in solution, e.g., an aqueous or alcoholic solution with multivalent cations therein, reacting with polysaccharides. Multivalent cations for use with polysaccharides, such as pectin and alginates, include calcium, strontium, barium, iron, silver, aluminum, magnesium, manganese, copper, and zinc. In exemplary embodiments, the cation is calcium and is provided for ionic gelation of polysaccharides in the form of an aqueous calcium chloride solution.

For example, in an exemplary embodiment, a carbonizable polymer precursor can be produced by providing a polymer in solution and subjecting the polymer to ionic gelation using multivalent cations, as mentioned above, to form a cross-linked carbonizable polymer precursor. Not to be limited by any specific concentration ranges, it would be appreciated that the concentration of the polymer in solution depends on the nature of the polymer, the nature of the solvent or solvents, the solution temperature, the type and concentration of the multivalent cations, and the molecular weight of the polymer.

The solution in which the polymer is provided can be any solution that allows cross-linking of the polymer to occur. For example, water can be used as it can allow for the polymers to undergo ionic gelation without interference by the water. Other solvents, such as ethanol, propanol, acetone, acetic acid, can also be used with the polymer, as these also do not appear to interfere with ionic gelation.

Examples of carbonizable polymers include polysaccharides, as mentioned above, which include pectin, for example. A solution of pectin from about 1 weight percent to about 15 weight percent, and more preferably from about 2 weight percent to about 10 weight percent can be solubilized in water and subjected to ionic gelation to provide predetermined levels of cross-linking stability to precursor composites including phenolic resin.

The solution comprising a carbonizable polymer can be cross-linked by ejecting the carbonizable polymer in an aqueous solution (e.g., pectin in water), drop-wise into an aqueous solution containing a multivalent cation, such as a solution of calcium chloride, wherein the cation can cross-link the polymer. The step of ejection can be performed by passing the carbonizable polymer containing solution through an orifice of varying diameters or through mesh pores by positive displacement (i.e., piston action) or over-pressurization. Ejection can also be performed through an array of orifices to improve throughput. A spinning disk can also be used to form polymer solution droplets.

In order to cross-link the carbonizable polymer, the polymer can also be sprayed with a multivalent cation, such as a solution of calcium chloride. It should be appreciated however that by using droplet formation wide distributions of droplet sizes can be experienced.

In order to provide instantaneous or nearly instantaneous cross-linking of the carbonizable polymer, the multivalent cationic solution should be above a minimum level. For example, if calcium chloride is used in conjunction with pectin, the calcium chloride should be present at a level of at least about 0.01%, but can be provided within the range of about 1.0% to about 5.0% and/or the range of about 2.0% to about 3.0%.

It is noted that the concentration of calcium chloride used can vary depending on the desired integrity of the resulting beads, as well as the other parameters by which the characteristics of the beads can be altered.

The levels of hardness and density of the carbonizable precursor can be controlled through the cross-linking process. More cross-links tend to lead to harder carbonizable precursor, while fewer cross-links lead to softer carbonizable precursor. It may also be controlled by the nature of the polysaccharide. For example, the crosslinking density of alginates can be controlled by the ratio of M:G (mannuronic acid to guluronic acid) units in the alginate. Therefore, depending upon the amount of reaction between the carbonizable polymer and the multivalent cations, and thus the number of salt bridges restraining movement of the carbonizable precursor polymer chains, the hardness of the carbonizable polymer precursor can be controlled.

For example, if multivalent cations react with the carbonizable precursor briefly, a gel can be formed by cross-linking the polymer and allowing salt bridges to form. However, if multivalent cations are allowed to react with the carbonizable polymer precursor for a longer reaction time, more dense solid particles can form leading to smaller pore formation upon carbonization and activation.

It is noted that the rate at which cross-links form can depend on the rate of penetration of the multivalent cations within the polymer. For example, the longer the polymer remains exposed to the multivalent cation solution, the more cross-links can be expected to form. For example, the cross-linking reaction of the polymers caused by the multivalent cations can be completed in just a few seconds, i.e., 1-10 seconds.

Preferably, multivalent cations are used in solution for the cross-linking reaction, for example, an aqueous or alcoholic solution with multivalent cations therein. Multivalent cations that can be used to cross-link polysaccharides, for example, include but are not limited to calcium, aluminum, manganese, copper, zinc, lanthanum, wherein calcium is preferred. The multivalent cations can be provided in multivalent solutions with multivalent metal salts, such as lanthanum or calcium salts, wherein calcium salts, such as calcium acetate, calcium chloride or other calcium salts can be provided in the multivalent solutions.

The shape of the carbonizable precursor can be varied depending on the viscosity of the solution containing the carbonizable polymer, the surface tension, and the height from which the drops of the solution of carbonizable polymer are dropped into the multivalent cation containing solution. For example, a carbonizable polymer precursor can be about 0.2 mm to about 6.0 mm in size (and every 0.1 value in between this range) depending on the means used to inject the drops into the multivalent cationic solution. For example, pectin in a water solution can be dropped dropwise into a calcium chloride solution and can form spherical (i.e., globular) or oval (i.e., elliptical or egg-like) carbonizable polymer precursor beads depending upon the viscosity of the solution, etc. To prepare drops that are more spherical and less oval in shape, the solution of carbonizable polymer can be injected into a multivalent cation solution.

The carbonizable polymer precursor can be left in the multivalent cation containing solution from about 5 minutes to 24 hours, more preferably from about 30 minutes to overnight (about 12-16 hours), yet more preferably from about 45 minutes to about 8 hours; still more preferably from about 1 hour to about 3 hours; and most preferably for about an hour, in order to allow for full cross-linking of the carbonizable precursor.

After incubation of the beads in the calcium chloride solution, the beads can then be filtered, washed, and dried. The beads can be filtered using any filtering device which will prevent the spheres/ovals from going through the filter. For example, wire mesh, plastic mesh, or centrifugation can be used to filter the spheres/ovals. The filtered spheres/ovals can then be washed to remove, for example, excess salt residing on the outer surfaces of the beads. The washing step however is optional. The washed spheres/ovals are then dried with a vacuum at less than about 70° C. until dry. However, the beads can also be subjected to air flow and elevated temperatures for drying as long as volatilization of the carbonizable precursor, where applicable, is avoided. The spheres/ovals can be dried on average from about 30 minutes to about 10 hours, about 1 to 4 hours, or about 2 hours depending upon the precursor.

The carbonizable precursor can be carbonized by subjecting the carbonizable precursor to thermal treatment at a rate of about 10° C. to about 25° C. and more preferably from about 15° C. to about 20° C. per minute from about room temperature to an upper range of about 700° C. to about 1000° C., and more preferably about 800° C. The thermal treatment can be performed in an inert environment, such as nitrogen, argon, or helium in order to reduce oxidation of the carbonizable natural polymer precursor.

After these steps, the beads maintain their spherical or oval shapes. For example, after carbonization of a pectin precursor at 800° C., the pectin precursor can retain generally about 35 to about 40% of their original weight. The resulting weight of the activated carbon after carbonization can vary depending on the carbonizable precursor, carbonization temperature, length of time taken to carbonize, combinations thereof and other parameters. Thus, the activated carbon can have a transverse dimension about the same as their precursor size (e.g., 0.2 mm to about 6.0 mm (and every 0.1 valve in between this range)), as shrinkage may be minimal.

Carbonizable precursor comprising pectin or other carbonizable, natural polymers cross-link by forming salt bridges, which lead to the formation of a macroporous network of pores upon carbonization with generally controlled porosity. Not being bound by any theories, it is believed that the degree of cross-linking affects carbon yield by providing a denser network of polymer chains. Porosity of the activated carbon can therefore be controlled by selecting different carbonizable precursors, varying the concentration of the multivalent cation, varying the process condition, and/or combinations thereof.

Additionally, carbonizable natural polymer precursors can also be formed from mixtures comprising combinations of natural and synthetic polymers. For example, a synthetic resin can be used in conjunction with a solution of pectin or other natural carbonizable polymer. As mentioned above, exemplary synthetic resins include but are not limited to phenolic resins, resoles (e.g., the resole-type resin VARCUM 29217 manufactured by Durez, Corp., Dallas, Tex.), and novolaks as discussed previously. Resoles are typically insoluble and can be formed as a dispersion in solution. Novolaks can be soluble and can be used in the form of a homogeneous solution. For example, a dispersion of phenolic resin can be used which is then homogenized with a solution comprising a natural, carbonizable, polymer, such as pectin. Preferred combinations of synthetic resin and natural carbonizable polymers include but are not limited to:

| Synthetic Resin | Natural, Carbonizable Polymer |
|---|---|
| Phenolic resin | Water based pectin solution |
| Petroleum pitch | Water based pectin solution |
| Activated Carbon | Water based pectin solution |
| Carbonized Carbon | Water based pectin solution |
| Activated and Carbonized Carbon | Water based pectin solution |
| Carbon Nanotubes | Water based pectin solution |

The mixture of the carbonizable precursor solution and the additional carbonizable precursor, carbonized structures, zeolites, or combinations thereof present as a second insoluble phase can be homogenized at high speeds or through the use of emulsifiers or other chemical aids. It is noted that the high viscosity of a natural polymer solution can aid in stabilizing the resulting emulsion. Next, the relatively homogenized mixture can be used to form droplets. The droplets can preferably be formed by a syringe or using a machine. Machines for such use include but are not limited to, an Inotech bead maker manufactured by Inotech AG of Dottikon, Switzerland. Using such a device, the droplets produced can be between 100 µm to 500 µm, preferably about 250 µm. Brace GmbH also makes machines, which produce microspheres or microcapsules (e.g., Spherisator 2002 Desktopencapsulation Unit; Karlstein, Germany).

The homogenized dispersion can then be extruded using any method of extrusion which can introduce in drop-wise fashion the dispersion into a multivalent cation solution. The homogenized dispersion can be extruded using needles of varying diameters, mesh sieves, or other methods discussed herein or known in the art. The homogenized dispersion gels upon contact with the calcium chloride solution or other ion containing solution to form beads.

The beads formed can then be filtered and washed as described herein. If using the combination of a phenolic resin and pectin solution, the beads formed can be yellow in appearance. If carbonized structures, zeolites, or combinations thereof are used in combination with a carbonizable precursor, the beads formed can also be yellow in appearance, or can include regions with the coloring of the carbonized structures, zeolites, or combinations thereof (i.e., black carbon nanotubes within a yellow pectin bead or white zeolites within a yellow phenolic resin).

The formed beads can optionally be thermally treated, wherein the cross-linking of the pectin polymer can aid in maintaining the shape of the carbonizable natural polymer precursor. For example, after cross-linking the pectin in the phenolic resin-pectin mixture, the carbonizable natural polymer precursor can be placed in an oven at about 150° C. to about 160° C. for a period of about 5 to about 24 hours without the carbonizable synthetic phenolic resin melting. Thus, the carbonizable composite or mixture can maintain its spherical shape despite being exposed to temperatures well in excess of the melting point of the phenolic resin. For this reason, the combination of natural and synthetic polymers is desired in forming a carbonizable precursor. It is believed that the pectin, which is cross-linked by calcium ions or other multivalent cation, immobilizes the phenolic resin such that it cannot melt, even after the beads are exposure to high temperatures for curing. For example, pectin can provide non-deformable beads at temperatures and rates of stabilization not feasible for 100% synthetic phenolic resins (resoles).

The synthetic resin and natural carbonizable polymer combination carbonizable natural polymer precursor can also be prepared by drying the carbonizable natural polymer precursor in a vacuum at a temperature below the decomposition temperature of the natural polymer, which is usually below about 250° C. to about 350° C. Preferably, the carbonizable natural polymer precursor can be dried under vacuum at about 50° C. for about 2 hours to stabilize the synthetic resin therein. The beads can then be carbonized by exposing the carbonizable natural polymer precursor, preferably in an inert environment, to heating as described above, wherein the heating preferably occurs at a rate of 20° C. per minute from room temperature to about 800° C.

Carbonized carbonizable precursor prepared by this method, for example, can yield about 50 weight % to about 60 weight % of original weight, and more preferably around 55 weight % of their original weight. Upon carbonization, the carbonizable composite or mixture of precursor can change color (i.e., become black in color from the original yellow).

Activated carbon prepared from a carbonizable precursor using a combination of a synthetic resin and a carbonizable polymer can therefore have controlled multi-modal porosities. Thus, the kinetics and the sorption of the activated carbon can be controlled.

Another type of carbonizable precursor contemplated includes a combination of a carbonized and/or activated carbon, and a carbonizable natural polymer. In this aspect, the carbonized and/or activated carbon can be dispersed in a solution containing a carbonizable natural polymer. For example, a fully or partially carbonized and/or activated carbon can be dispersed in a solution of pectin to form a carbonizable precursor composite of the carbon and the pectin.

Similar to the other carbonizable precursors, the carbon-natural polymer combination precursor composite can also be formed by injecting the combination drop-wise into a solution containing a multivalent cation, such as a calcium chloride solution, in order to cross-link the natural polymer. The ovals/spheres created can then be filtered, washed, and further carbonized and/or activated as described above. The carbonization step may be sufficient to lead to beads with multimodal pore distribution as the pre-activated carbon is believed to maintain the pore structure it possessed following carbonization of the composite.

Also, outer, additional layers can be formed on the beads to further the control and to further tailor porosities of the beads from outer portions toward central portions of the bead. Thus, carbonizable beads can be grown to larger sizes by adding one or more additional carbonizable layers formed on or around beads.

E. Uses of Multi-Modal Pore Distribution Activated Carbon

It is envisioned that activated carbon formed as mentioned above can be used in smoking articles, wherein the characteristics of the multi-modal pore distribution activated carbon can be utilized. Examples of smoking articles which can utilize the multi-modal pore distribution activated carbon therein include cigarettes, including traditional cigarettes with tobacco filler in tobacco rods, and non-traditional cigarettes with tobacco mats. Preferably, the cigarettes utilize the multi-modal pore distribution activated carbon within filters.

The terms "smoking articles" and "tobacco products" include cigarettes, pipes, and cigars. Non-traditional cigarettes such as cigarettes for electrical smoking systems are also included in the definition of smoking articles or cigarettes generally.

"Smoking" of a cigarette is intended to mean the heating, combusting or otherwise causing a release of smoke or aerosol from a smokeable material such as tobacco. Generally, smoking of a cigarette involves lighting one end of the cigarette and drawing the smoke downstream through the mouth end of the cigarette, while the tobacco contained therein undergoes combustion, pyrolysis or release of volatiles. However, a cigarette can also be smoked by other means also included in the term "smoking." For example, a cigarette can be smoked by heating the cigarette using a combustible heat source, whose thermal output is used to volatilize tobacco flavors during a draw upon the smoking article, as described, for example, in commonly-assigned U.S. Pat. Nos. 6,053, 176; 6,026,820; 5,934,289; 5,591,368; or 5,322,075, each of which is incorporated herein by reference in its entirety for all purposes.

Traditional cigarettes deliver flavor and aroma to the smoker as a result of combustion, during which a mass of tobacco is combusted at temperatures which often exceed 800° C. during a puff. The heat of combustion releases various gaseous combustion products and distillates from the tobacco. As these gaseous products are drawn through the cigarette, they cool and condense to form an aerosol, which provides the tastes and aromas associated with smoking. Traditional cigarettes produce sidestream smoke during smoldering between puffs. Once lit, they must be fully consumed or be discarded. Re-lighting a traditional cigarette is possible but is usually an unattractive proposition to a discerning smoker for subjective reasons (e.g., flavor, taste, odor).

An alternative to the more traditional cigarettes includes smoking articles in which the combustible material itself does not release tobacco smoke or aerosol. Such smoking articles can include a combustible, carbonaceous heating element (heat source) located at or about one end of the smoking article and a bed of tobacco-laden elements located adjacent the aforementioned heating element. The heating element can be ignited when a smoker draws upon the smoking article, wherein heat generated by the heating element can be communicated to the bed of tobacco-laden elements so as to cause the bed to release a tobacco aerosol. While this type of smoking device can produce little or no sidestream smoke, it can still generate products of combustion at the heat source.

Non-traditional smoking articles include, for example, cigarettes for electrical smoking systems as described in commonly-assigned U.S. Pat. Nos. 6,026,820; 5,988,176; 5,915, 387; 5,692,526; 5,692,525; 5,666,976; and 5,499,636, the disclosures of which are incorporated by reference herein in their entireties for all purposes. The compositions disclosed herein can also be utilized in such non-traditional cigarettes.

Multi-modal pore distribution activated carbon can be incorporated in a cigarette filter at one or more desired locations. For example, an activated carbon segment in a traditional cigarette or an electrical smoking system cigarette containing multi-modal pore distribution activated carbon therein can be combined with a free-flow filter. The activated carbon can be in contact with (i.e., abut) a free-flow filter positioned between the free-flow filter and a mouthpiece filter plug, or in contact with (i.e., abut) a mouthpiece filter plug. Additionally, the activated carbon segment can have a diameter substantially equal to that of an outer diameter of a free-flow filter to minimize by-pass of smoke during the filtration process if so desired.

The amount of multi-modal pore distribution activated carbon used in exemplary embodiments of the smoking article can depend on the amount of selected gas-phase constituents in the tobacco smoke, as well as the type of constituents desired to be removed from the tobacco smoke as desired.

F. Measuring Pore Sizes of Multi-Modal Pore Distribution Activated Carbon

Pore sizes of multi-modal pore distribution activated carbon can be measured by any known pore size distribution method. For example, pore sizes can be measured by density or surface tension measurements.

In one exemplary method of measuring pore sizes for multi-modal pore distribution activated carbon, gas absorption can be used. For example, surface area analyzers, porosimeters, pycnometers, or other particle characterization instruments can be used, wherein exemplary instruments can be provided by Micromeritics Instrument Corporation of Norcross, Ga.

EXAMPLES

Example 1

Preparation of Carbonizable Precursor Beads Containing Dispersed Carbon Nanotubes Carbonizable precursor beads were made via an ionic gelation of pectin solutions containing about 0.1 weight percent ("wt %") of carbon nanotubes. First, a solution of pectin at 4 wt % in water was prepared. To that solution, about 0.2 wt % of carbon nanotubes was added. Following sonication and centrifugation for 30 min, a stable dispersion was produced. The final amount of nanotubes was about 0.1 wt % (insoluble aggregates were removed during centrifugation). This dispersion was then added drop-wise into a solution of calcium chloride. As the pectin/carbon nanotube drops impacted the calcium chloride solution, they gelled forming a spherical shape. The gel spheres were left in the calcium chloride solution for about an hour. The spheres were then filtered, washed and dried in vacuum at 50° C. for about 2 hours.

Figure 1:
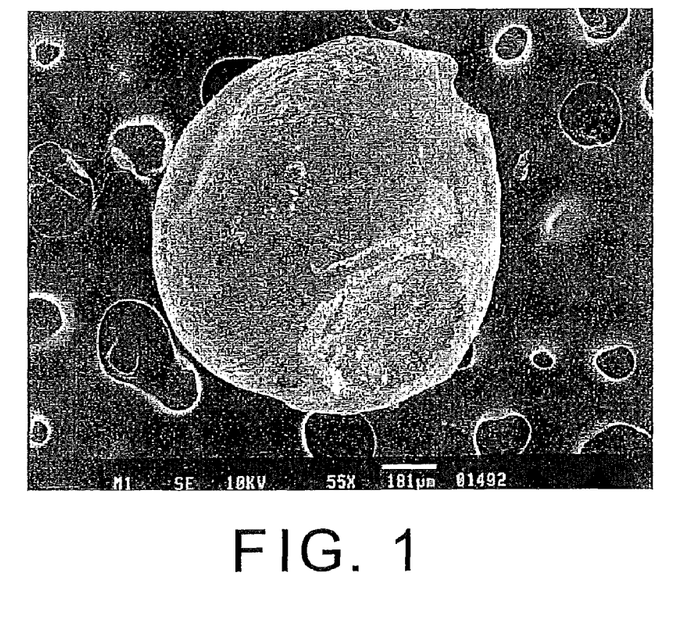
FIG. 1. A multi-modal pore distribution activated carbon particle is illustrated, wherein the multi-modal pore distribution activated carbon particle is formed from a pectin-nanotube mixture prepared according to Example 1.
Figure 2:
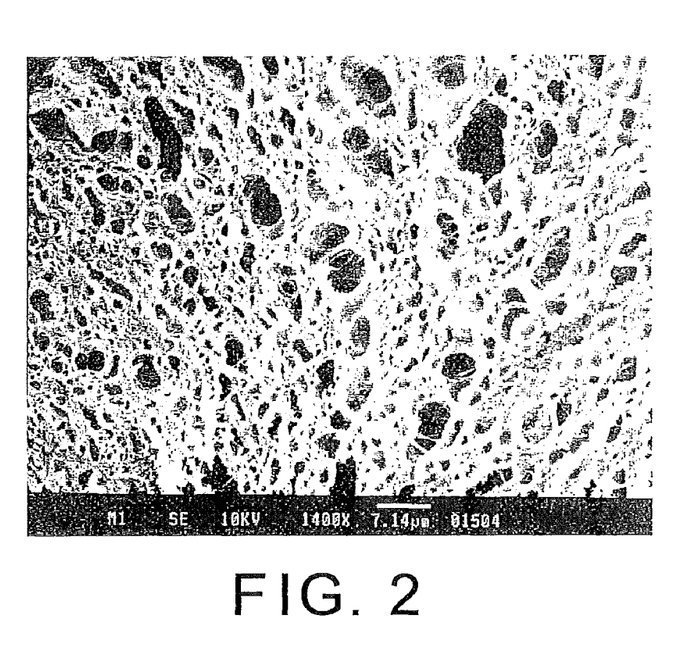
FIG. 2. A cross-section of a multi-modal pore distribution activated carbon particle from a pectin-nanotube mixture prepared as described in Example 1.
Figure 3:
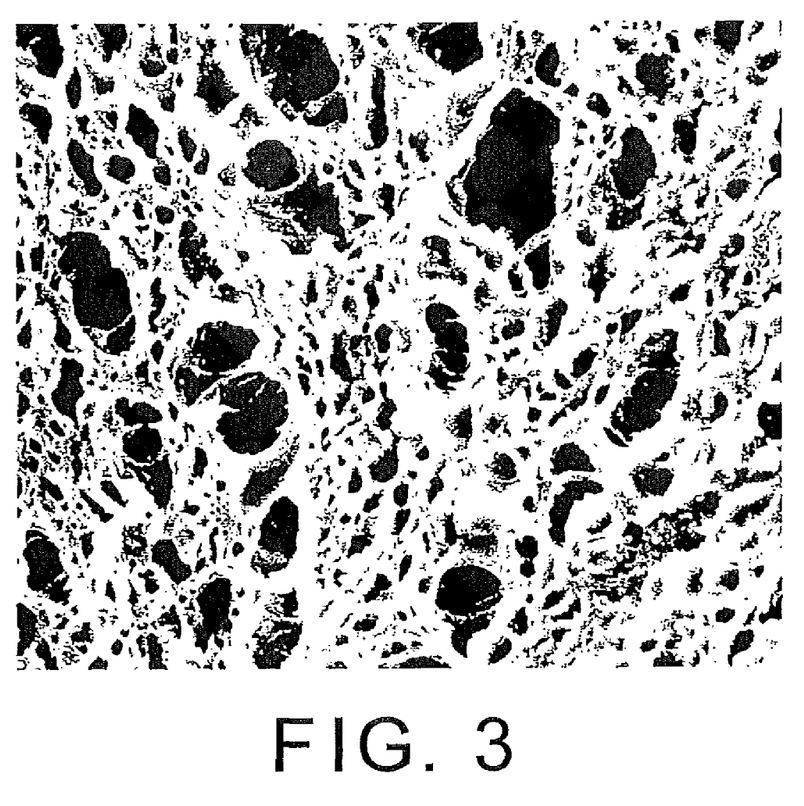
FIG. 3. A cross-section of an exemplary pectin precursor activated carbon.
Figure 4:
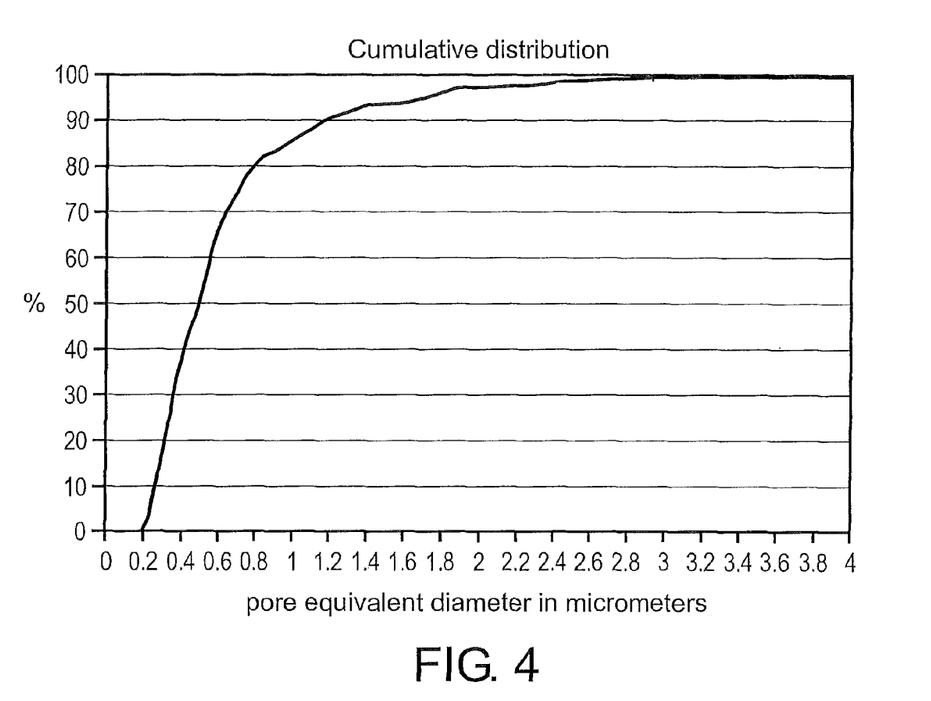
FIG. 4. A graph of a pore size distribution for an exemplary pectin precursor activated carbon.

Several beads were then subjected to thermal analysis as follows: heating at 20° C. per minute from room temperature to 800° C. in helium and subsequent annealing at 800° C. for 30 min. At the end of the carbonization step the beads retained their spherical shape. The beads were also strong enough such that rolling between the fingers did not break the beads, as no black residue was noticed when individual spheres were subjected to that kind of strength test. The beads retained about 35% to about 40% of their original weight following the carbonization step at 800° C. A bead produced by this method is shown in FIG. 1. A cross section of the pectin-multi-wall nanotube containing bead is shown in FIG. 2. For comparison, a carbonized pectin with large pores is shown in FIG. 3, wherein the pore size distribution is shown in FIG. 4.

Example 2

Preparation of Carbonizable Precursor Beads Containing Pectin and Phenolic Resin In a variation of the above Example 1, a phenolic resin (water insoluble powder) dispersion was prepared in a solution of pectin via the use of a homogenizer. First, a solution of pectin at 4 wt % in water was prepared. To that solution, about 4 wt % of phenolic resin was added. The dispersion was stable and separation of the dispersed phase was not observed for several hours following preparation. The dispersion was then extruded dropwise and ionically gelled in a $CaCl_2$ solution to yield yellow gel beads. As the pectin/phenolic resin drops impacted the calcium chloride solution, they gelled forming a spherical shape. The gel spheres were left in the calcium chloride solution for about an hour. The spheres were then filtered, washed and dried in vacuum.

A fraction of these beads were placed in an oven at 150° C. to about 160° C. overnight in order to examine whether the beads would melt at temperatures above the melting point of the phenolic resin. The next morning, the beads were removed from the oven, wherein it was noticed that the beads had retained their spherical shape. However, they changed in color and became dark brown.

While not wishing to be bound by theory, it is believed that this discoloration was caused by curing of these phenolic resins. It is also believed that the cross-linked pectin immobilized the phenolic resin and thus prevented the melting of the phenolic resins within the beads following their exposure to the higher temperatures of curing (the higher the curing temperature the faster the curing reaction).

The beads were also carbonized as described in Example 1, and had a yield of about 55%. Therefore, it appears that a higher yield can be expected for carbonization of phenolic precursors.

Other carbon precursors can potentially be used in formulations that are forced into gellation following an ionotropic gellation method, an irreversible thermal gellation, etc. For example, a dispersion of petroleum pitch in a water based pectin solution can be forced to gel in calcium chloride. In another example, pre-carbonized and/or activated carbon can be dispersed into a pectin solution, gelled and then subjected to a further carbonization or activation process as a beaded material.

After carbonization and activation, the final activated carbon is expected to have larger pores from the carbonization and activation of the pectin, as well as smaller pores from the carbonization and activation of the phenolic resin. Thus, using the larger pores (e.g., the "transport pores" or mesopores or macropores with pore sizes greater than about 20 Å to about 500 Å), the activated carbon can be more efficient, allowing more constituents to be in contact with more of the surface area of the activated carbon leading to more efficiency in the adsorption properties of the activated carbon. Additionally, with the provision of the additional smaller pores (e.g., the "trapping pores" or micropores with pore sizes less than about 20 Å), the activated carbon can more tightly bind and absorb the constituents that were brought in through the larger pores and can hold the constituents within the smaller pores.

Variations and modifications of the examples above will be apparent. Such variations and modifications are to be considered within the purview and scope of the claims appended hereto.

All cited patents and publications referred to in this application are herein incorporated by reference in their entirety for all purposes.

What is claimed is:

1. A method of producing a multi-modal pore distribution activated carbon comprising the steps of:
    (i) preparing a solution comprising a polysaccharide precursor, wherein the polysaccharide precursor is alginate;
    (ii) mixing an additional material with the polysaccharide precursor in the solution;
    (iii) cross-linking the polysaccharide precursor with the additional material mixed therein by ionic-gelation, wherein the cross-linking comprises reacting the polysaccharide precursor with multivalent cations in solution;
    (iv) controlling a level of hardness and density of the polysaccharide precursor based on a ratio of mannuronic acid to guluronic acid in the alginate;
    (v) carbonizing the mixture of the polysaccharide precursor and the additional material; and
    (vi) activating the carbonized mixture to form a multi-modal pore size distribution activated carbon.

2. The method of claim 1, wherein the additional material comprises polymers, zeolites or carbonized structures.

3. The method of claim 1, wherein the multivalent cations comprise calcium, strontium, barium, iron, silver, aluminum, magnesium, manganese, copper, zinc, or combinations thereof.

4. The method of claim 1, wherein the carbonizing the mixture of the polysaccharide precursor and the additional material comprises heating the mixture in a non-oxidizing environment.

5. The method of claim 1, wherein the activating the carbonized mixture to form a multi-modal pore distribution activated carbon comprises heat treating the carbonized mixture with an oxidizing agent, wherein activation is conducted at a temperature of from about 800° C. to about 1000° C., and for a period of about 30 minutes to about 5 hours.

6. The method of claim 1, wherein the additional material comprises phenolic resin, pitch, or a combination thereof.

7. The method of claim 1, wherein the additional material comprises carbonized carbon nanotubes.

8. The method of claim 1, wherein the multivalent cations comprise calcium in a solution of calcium chloride, a calcium acetate, or a calcium salt.

9. The method of claim 1, wherein the multivalent cations in solution comprises an aqueous or alcoholic solution with multivalent cations therein.

10. The method of claim 1, further comprising dropping the solution of polysaccharide precursor into the multivalent cations in solution to form a polysaccharide precursor bead and varying a shape of the polysaccharide precursor bead based on a viscosity and surface tension of the polysaccharide precursor solution, and a height from which the solution of polysaccharide precursor is dropped into the multivalent cations in solution.

11. The method of claim 10, further comprising injecting the drops of the polysaccharide precursor into the multivalent cations in solution to produce a spherical polysaccharide precursor bead.

12. The method of claim 10, further comprising drying the polysaccharide precursor beads with a vacuum at less than 70° C. until dry.

13. The method of claim 1, wherein cross-linking the polysaccharide precursor with the additional material mixed therein by ionic-gelation further comprises leaving the polysaccharide precursor with the additional material in the multivalent cations in solution for approximately 1 hour to approximately 3 hours in order to allow for full cross-linking of the polysaccharide precursor.

14. A method of making different shape absorbents, comprising:
- immobilizing and stabilizing precursors in a polysaccharide media, wherein the polysaccharide media is alginate, and the step of immobilizing and stabilizing precursors in a polysaccharide media comprises cross-linking the precursors with the polysaccharide media by ionic gelation, and wherein the cross-linking comprises reacting the polysaccharide precursor with multivalent cations in solution;
- controlling a level of hardness and density of the polysaccharide precursor based on a ratio of mannuronic acid to guluronic acid in the alginate; and
- activating the immobilized and stabilized precursors in the polysaccharide media.

15. The method of claim 14, wherein the stabilization occurs below the melting temperature of the precursor.

16. The method of claim 14, wherein the precursor comprises carbon.

17. The method of claim 14, wherein the multivalent cations in solution comprises an aqueous or alcoholic solution with multivalent cations therein.

18. The method of claim 14, further comprising dropping the solution of polysaccharide precursor into the multivalent cations in solution to form a polysaccharide precursor bead and varying a shape of the polysaccharide precursor bead based on a viscosity and surface tension of the polysaccharide precursor solution, and a height from which the solution of polysaccharide precursor is dropped into the multivalent cations in solution.

19. The method of claim 18, further comprising injecting the drops of the polysaccharide precursor into the multivalent cations in solution to produce a spherical polysaccharide precursor bead.

\* \* \* \* \*